(12) United States Patent
Brown

(10) Patent No.: US 7,106,732 B2
(45) Date of Patent: Sep. 12, 2006

(54) DEFAULT ROUTE CODING

(75) Inventor: David A. Brown, Carp (CA)

(73) Assignee: MOSAID Technologies Incorporated, Kanata (CA)

(*) Notice: Subject to any disclaimer, the term of this patent is extended or adjusted under 35 U.S.C. 154(b) by 849 days.

(21) Appl. No.: 10/004,280

(22) Filed: Oct. 31, 2001

(65) Prior Publication Data

US 2002/0091856 A1    Jul. 11, 2002

Related U.S. Application Data

(60) Provisional application No. 60/258,436, filed on Dec. 27, 2000, provisional application No. 60/294,387, filed on May 30, 2001.

(51) Int. Cl.
*H04L 12/56* (2006.01)
*G06F 12/02* (2006.01)

(52) U.S. Cl. ............... 370/389; 370/397; 711/216; 711/221

(58) Field of Classification Search ............... 370/389, 370/392; 711/216, 221; 717/168, 171; 709/242
See application file for complete search history.

(56) References Cited

U.S. PATENT DOCUMENTS

| | | | | |
|---|---|---|---|---|
| 5,479,401 | A | 12/1995 | Bitz et al. | 370/60.1 |
| 5,857,196 | A | 1/1999 | Angle et al. | 707/102 |
| 5,946,679 | A * | 8/1999 | Ahuja et al. | 707/3 |
| 6,192,051 | B1 * | 2/2001 | Lipman et al. | 370/389 |
| 6,385,649 | B1 * | 5/2002 | Draves et al. | 709/224 |
| 6,434,144 | B1 * | 8/2002 | Romanov | 370/392 |
| 6,956,858 | B1 * | 10/2005 | Hariguchi et al. | 370/395.31 |
| 2002/0080798 | A1 * | 6/2002 | Hariguchi et al. | 370/395.31 |

FOREIGN PATENT DOCUMENTS

WO    WO 99/14906    3/1999

OTHER PUBLICATIONS

Hariguchi, Network Routing table, Jun. 30, 2000, U.S. Appl. No. 60/215,653, pp. 1-52, figs 1-23 and appendixes 1-2.*
Degermark Mikael et al., "Small Forwarding Tables for Fast Routing Lookups", Department of Computer Science and Electrical Engineering, Luleå University of Technology, Sweden *SigCom '97*Cannes, France pp. 3-14 (1997).

* cited by examiner

*Primary Examiner*—Steven Nguyen
(74) *Attorney, Agent, or Firm*—Hamilton, Brook, Smith & Reynolds, P.C.

(57) ABSTRACT

A multi-level lookup table includes a plurality of search levels with each search level including a plurality of subtrees, each subtree representing a plurality of nodes. A search of the multi-level lookup table for an entry corresponding to a search key results in a value stored in an entry associated with the node in a subtree. A default value is associated with the root of the subtree. Multiple entries for the subtree can store the default value. To minimize route update time, the default value associated with the subtree is stored in a single location. Instead of storing the default value in multiple entries, each entry stores a use default indicator to indicate that the default value stored in the single location is to be used. To further reduce the number of locations to modify to update the default route, the single location can store an inherit indicator to indicate that the default value for the subtree is inherited from another subtree.

17 Claims, 11 Drawing Sheets

DEFAULT ROUTE CODING

RELATED APPLICATION(S)

This application claims the benefit of U.S. Provisional Application No. 60/258,436, entitled "Algorithm IPv4 Longest Prefix Match (LPM)" filed on Dec. 27, 2000 and U.S. Provisional Application No. 60/294,387 entitled "Load Balancing in IP Address Lookup" filed May 30, 2001. The entire teachings of the above applications are incorporated herein by reference.

BACKGROUND OF THE INVENTION

The Internet is a set of networks connected by routers. A router maintains a routing table that indicates for each possible destination network, the next hop to which a received data packet should be forwarded. The next hop may be another router or the final destination.

An Internet Protocol ("IP") data packet received at a port in a router includes an IP destination address. The IP destination address is the final destination of the IP data packet. Currently there are two versions of IP, IP version 4 ("IPv4") and IP version 6 ("IPv6"). IPv4 provides a 32-bit field in an IP header included in the data packet for storing the IP destination address. The router forwards a received data packet to a next-hop router or the final destination if the destination is the local network, dependent on the IP destination address stored in the IP header.

A 32-bit IPv4 destination address provides 4 billion possible routes. An Internet router typically stores 50,000 of the 4 billion possible routes. However, the number of stored routes will increase with the growth of the Internet and the widespread use of IPv6.

Originally, the IP address space was divided into three classes of IP addresses; A, B and C. Each IP address space was divided into a network address and a host address. Class A allowed for 126 networks and 16 million hosts per network. Class B allowed for 16382 networks with 64,000 hosts per network and class C allowed for 2 million networks with 256 hosts per network. However, dividing the IP address space into different classes reduced the number of available IP addresses. Class C only allowed a maximum of 256 hosts per network which is too small for most organizations. Therefore, most organizations were assigned a Class B address, taking up 64,000 host addresses which could not be used by other organizations even if they were not used by the organization to which they were assigned. Hosts in an organization with a Class B IP address all store the same network address in the 16 Most Significant Bits ("MBSs"), for example, 128.32.xx.xx.

Classless InterDomain Routing ("CIDR") was introduced to free up unused IP host addresses. The remaining unused networks are allocated to organizations in variable sized blocks. An organization requiring 500 addresses gets 500 continuous addresses. For example, an organization can be assigned 500 available addresses starting at 128.32.xx. The number of routes stored by a router has increased since the introduction of Classless InterDomain Routing. Classless InterDomain Routing requires longest prefix matching instead of searching for a matching network address in order to find the corresponding next hop for the IP destination address. For example, a search can no longer stop after the 16 MSBs of a Class B IP address, for example, 128.xx.xx because 128.32.4.xx may be assigned to another organization requiring a different next hop.

One method for searching for a longest prefix match for a key is through the use of a binary tree search. A binary tree search matches a 32-bit input bit by bit down to 32 levels, requiring 32 searches to find the entry matching the 32-bit key. Another method for searching for a match is through the use of a Patricia tree. A Patricia tree reduces the number of searches required if there are no entries down a leaf of the binary tree.

Yet another method for efficiently searching for a next hop associated with an IP destination address is described in PCT application Serial Number PCT/SE98/00854 entitled "Method and System for Fast Routing Lookups" by Brodnick et al. filed on May 11, 1998. The method described by Brodnick reduces the number of next hops stored by not storing duplicate routes. By reducing the number of next hops, the memory requirement is reduced so that a route lookup table can be stored in fast cache memory.

Brodnick et al. divides the 32-bit binary tree into 3-levels. Dividing the 32-bit binary tree into 3-levels reduces the number of searches to three. The indexed entry in the first level indicates whether the search can end at the first level with the route taken from the entry, or the search must continue to a subsequent level using a further portion of the IP destination address.

FIG. 1A illustrates a prior art 64K (65536) bit map representing the first level of a binary tree. A 64K bit map 30 represents the leaves or nodes 44 of the binary tree at depth 16, with one bit per node 44. The bit map is divided into bit-masks of length 16. There are $2^{12}$=4096 bit masks in the 64k bit map. One bit mask is shown in FIG. 1A. A bit in the bit map 30 is set to '1' if there is a subtree or a route index stored in an array of pointers corresponding to the node 44. A bit in the bit map 30 is set to '0' if the node shares a route entry with a previous node 44.

FIG. 1B illustrates a prior art lookup table implemented in cache memory. The lookup table includes an array of code words 36, an array of base indices 34 and a map table 40. A 32-bit IP address 38 is also shown in FIG. 1B. A codeword 46 is stored in the array of code words 36 for each bit mask in the bit map 30 (FIG. 1A). The code word 46 includes a six-bit value 46a and a 10-bit offset 46b. A base index 42 is stored in the array of base indices 34 for every four code words 46 in the array of code words 36.

The array of code words 36, array of base indices 34 and map table 40 are used to select a pointer in an array of pointers (not shown). The pointer stores a route index or an index to perform a further search.

A group of pointers in the array of pointers is selected by selecting a code word 46 in the array of code words 36 and a base index 42 in the array of base indices 34. The code word 46 is selected using the first 12 bits 50 of the IP address 38. The base index 42 is selected using the first 10 bits 48 of the IP address 38. The correct pointer in the group of pointers is selected using the map table 32.

The 10-bit value 46b in the selected code word 36 is an index into the map table 32. The map table 32 maps bit numbers within a bit-mask to 4-bit offsets. The offset specifies the pointer within the selected group of pointers in the array of pointers. The 10-bit value 46b selects the row in the map table 32 and bits 19:16 of the IP address 52 selects the 4-bit offset 54.

Thus, a search for a pointer requires the following cache memory accesses: (1) read a 16 bit code word 46; (2) read a 16-bit base address 42; (3) read a 4 bit offset 54 from the map table 32; (4) read a pointer at a pointer index where the pointer index is the sum of the base address 42, the code word offset 46a and the 4-bit offset 54.

The same memory accesses are required for each level of the binary tree. Thus, a search of three levels requires 12 memory accesses.

SUMMARY OF THE INVENTION

U.S. patent application Ser. No. 09/733,627 filed on Dec. 8, 2000 describes a method and apparatus for storing a route for an Internet Protocol ("IP") address in a multi-level lookup table. A multi-level search is performed to find a route index stored in a mapper in the lookup table which indexes a range of IP addresses associated with a range of leaves of a subtree. The route index for the root of a subtree serves as a default index for the subtree. The default index being repeated in the mapper for ranges of leaves using the default. As new routes are learned, the lookup table is updated to add new route indexes. Adding a single new route to the lookup table can result in the modification of the route indexes for the roots of a plurality of subtrees requiring the modification of multiple default routes stored in mappers in the lookup table. FIGS. 2A–B are binary tree representations of routes stored in the multi-level lookup table.

FIG. 2A is a binary tree representation of route indexes stored in the multi-level route lookup table. Three levels 200, 202, 204 of the multi-level route lookup table are shown, each level having a respective subtree A, B, C. Routes or indexes to routes for r0, r1 and r2 are stored in the multi-level route lookup table. Route r0 is stored in subtree A in level_2 200, route r1 is stored in subtree B in level_3 202 and route r2 is stored in subtree C in level_4 204. Each node at the bottom of each subtree is associated with a route or a default route. Route r0 is the route associated with the root of subtree B and the root of subtree C. Thus, nodes $208^1$–$208^8$ in subtree A in level_2 200 correspond to route r0. Nodes $208^9$–$208^{16}$ in subtree A correspond to a default route associated with the root of a level 1 subtree (not shown). Nodes $206^1$–$206^4$ in subtree C in level_3 202, correspond to route r0, the route associated with the root of subtree B and thus the default route for subtree B. Nodes $206^5$–$206^8$ correspond to route r1 and nodes $206^9$–$206^{16}$ correspond to route r0; that is, the default route for subtree B. Nodes $210^7$–$210^8$ in subtree C in level_3 204, correspond to route r2 and nodes $210^1$–$210^6$ and $210^9$–$210^{16}$ correspond to route r0; that is, the default route for subtree C. Route r0 is the route for nodes $208^1$–$208^8$ in subtree A in level_2 200. Route r0 is also the route for nodes $206^1$–$206^4$ and $206^9$–$206^{16}$ in subtree B in level_3 202 and nodes $210^1$–$210^6$ and $210^9$–$210^{16}$ subtree C in level_4 204.

FIG. 2B is the binary tree representation shown in FIG. 2A with an additional route. As shown, route r3 has been added to subtree A in level_2 200. Thus, route r0 changes to route r3 for nodes in subtrees A, B and C. The default route for nodes in subtree B in level_3 202 and subtree C in level_4 204 must be modified to store route r3 instead of route r0. Thus, nodes $206^1$–$206^4$ and $206^9$–$206^{16}$ in subtree B in level_3 202 and nodes $210^1$–$210^6$ and $210^9$–$210^{16}$ in subtree C in level_4 204 must be modified to store route r3 instead of route r0. The number of updates required when a route is added to the multi-level lookup table decreases the time available for searching the route table.

In accordance with the present invention, to minimize the number of updates to update routes in a lookup table, a default route memory stores a default route for a subtree. The default route is shared by nodes in the subtree. The default route is modified by performing a single write to the default route memory.

The default route corresponds to the route associated with the root of the subtree. An inherit indicator may be stored in the default route memory instead of the default route to indicate that the default route associated with the root of the subtree is inherited from another subtree. The inherited default route is forwarded by a default index pipeline.

If the subtree is a dense subtree, the default route memory is included in a field in a dense subtree descriptor. The default route is shared by nodes in the subtree by storing a use default indicator instead of the default route itself in a mapper entry associated with at least one node in the subtree. Upon detecting the use default indicator stored in the mapper entry, the default route stored in the default route memory is returned as the result of the search of the lookup table.

If the subtree is a sparse subtree and the number of routes stored for the subtree is greater than one, the default route memory is included in the sparse subtree entry. If the number of routes is one, the default route memory is included in a default mapper entry associated with the sparse subtree entry.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
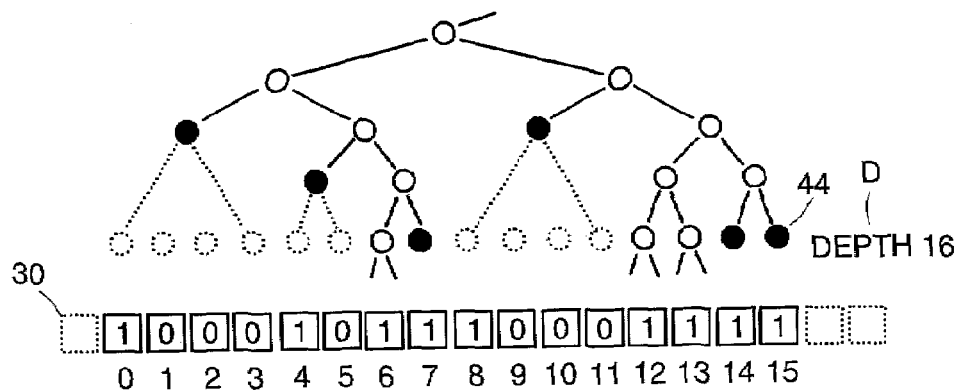
FIG. 1A illustrates a prior art 64k (65536) bitmap representing the first level of a binary tree.
Figure 1B:
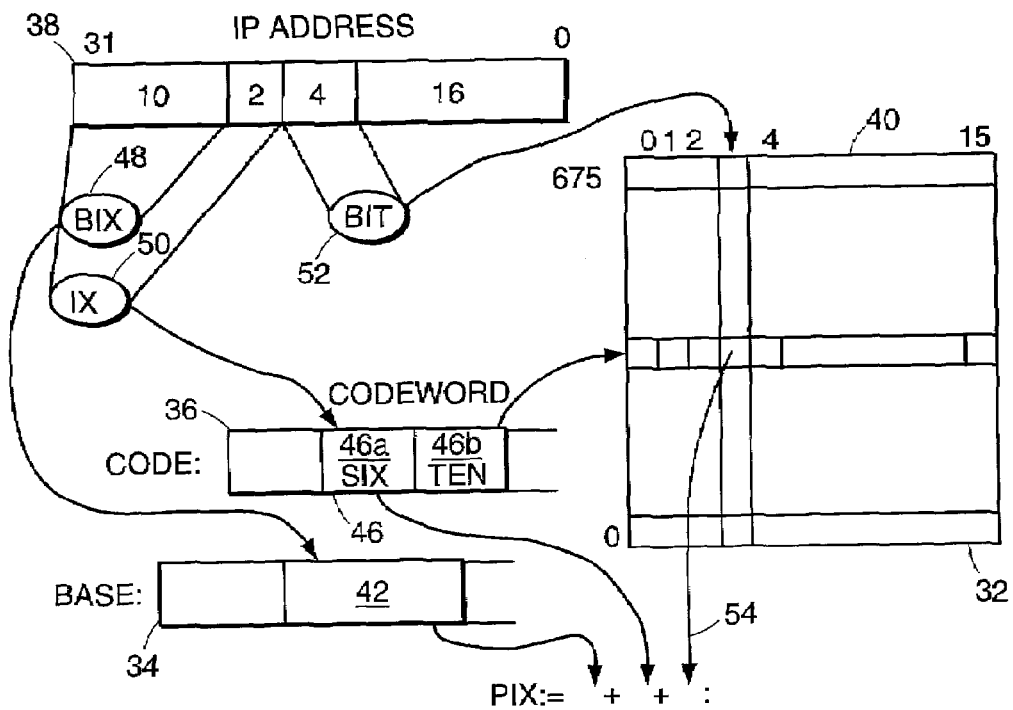
FIG. 1B illustrates a prior art lookup table implemented in cache memory.
Figure 2A:
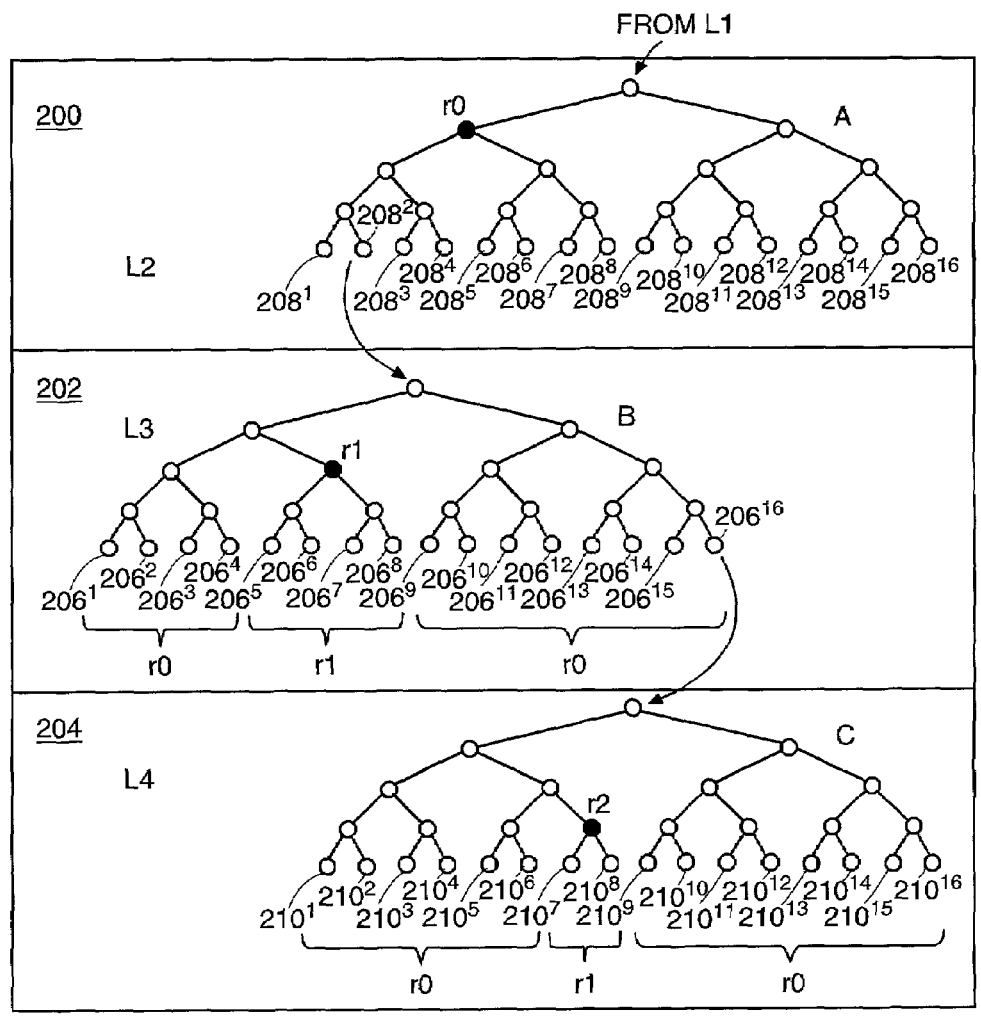
FIG. 2A is a binary tree representation of route indexes stored in a multi-level lookup table.
Figure 2B:
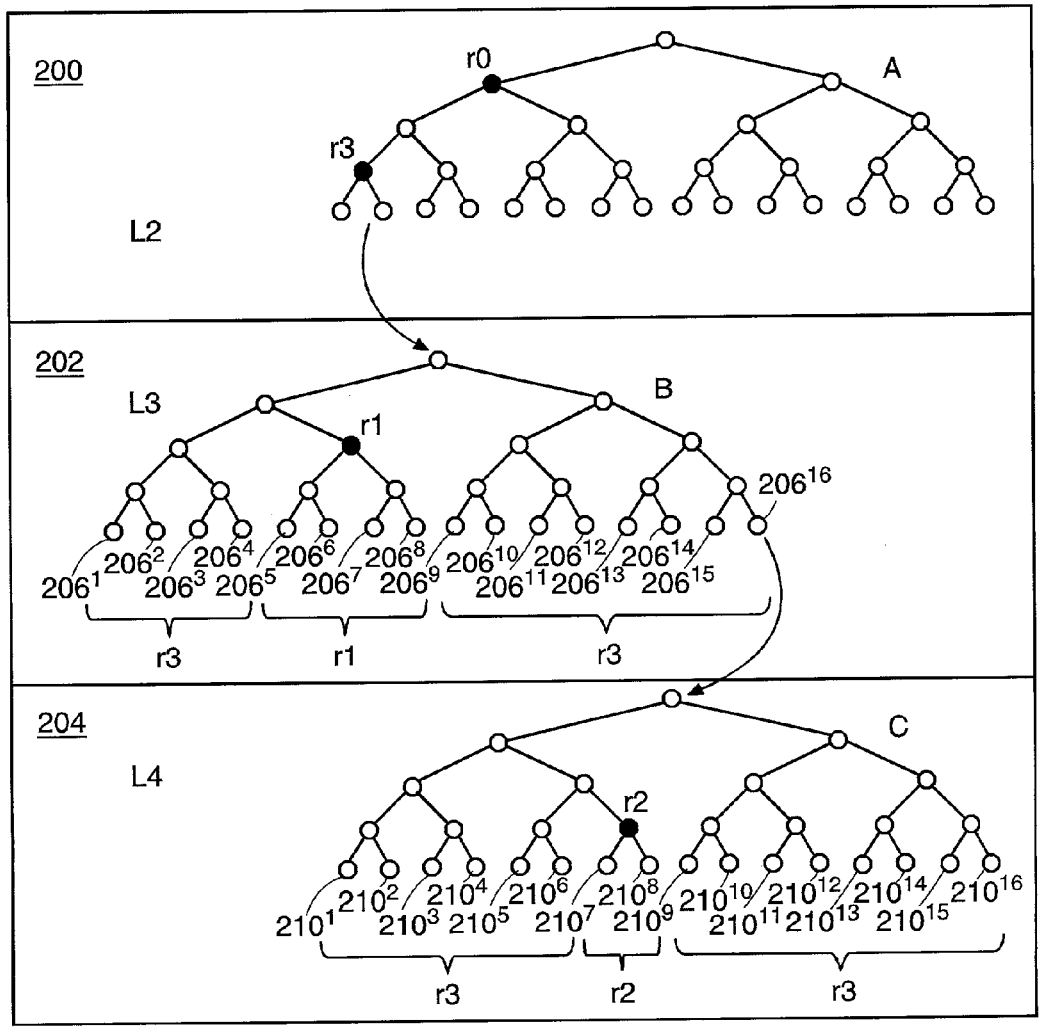
FIG. 2B is the binary tree representation shown in FIG. 2A with an added route.
Figure 3A:
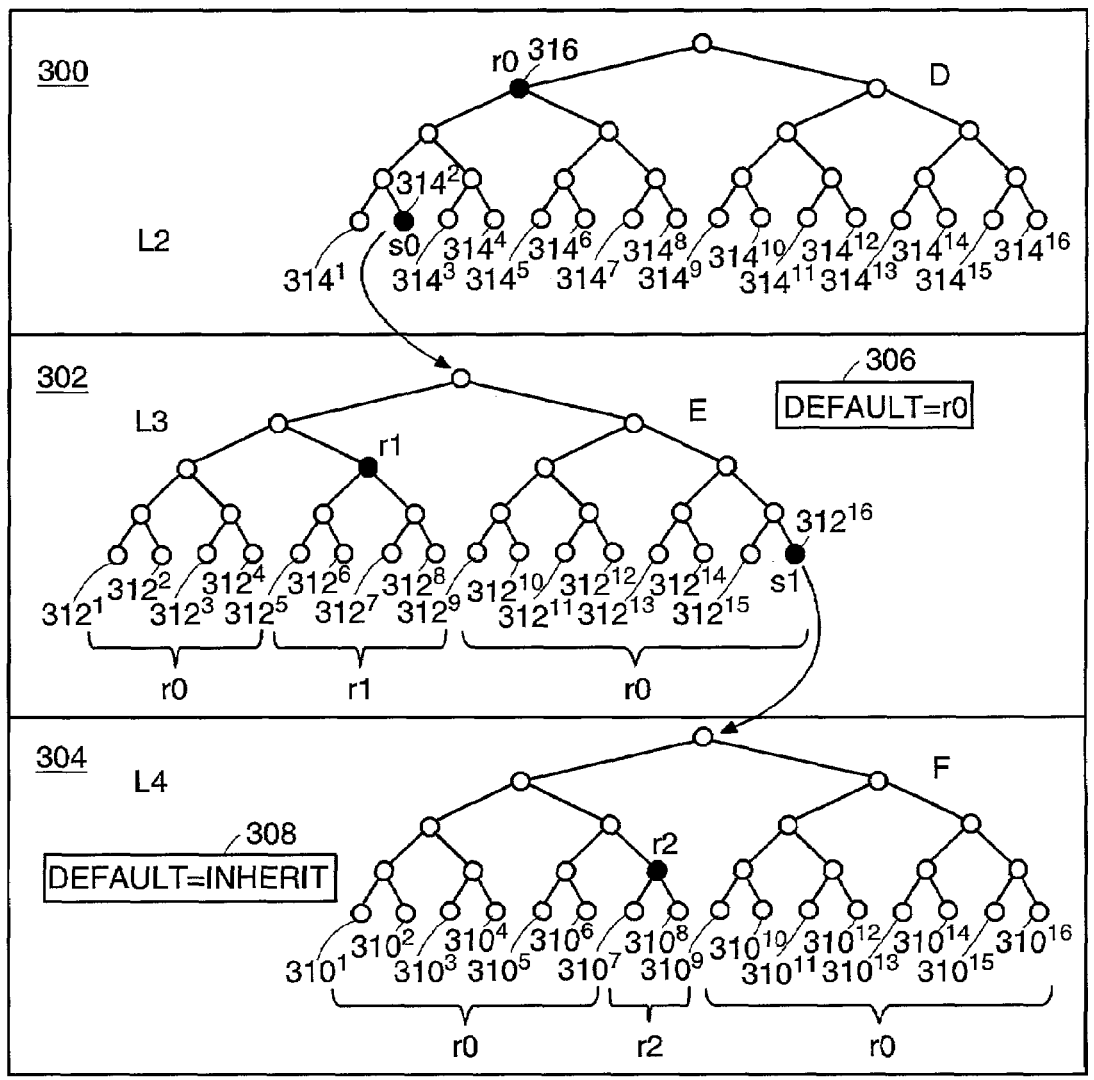
FIG. 3A is a binary tree representation of routes stored in a multi-level lookup table, with each subtree including a default route memory according to the principles of the present invention.

FIG. 3A is a binary tree representation of routes stored in a multi-level lookup table, with each subtree including a default route memory 306, 308 according to the principles of the present invention. Three levels 300, 302, 304 of the binary tree representation of the multi-level lookup table are shown. Level_2 300 includes subtree D. Level_3 302 includes subtree E and level_4 304 includes subtree F. Node $314^2$ in subtree D and node $312^{16}$ in subtree E store subtree indexes to a subtree in a lower level. Node $314^2$ stores a subtree index to subtree E and node $312^{16}$ stores a subtree index to subtree F.

The multi-level lookup table stores a subtree descriptor for each subtree. Subtree descriptors are described in co-pending U.S. patent application Ser. No. 09/886,649 entitled "Method And Apparatus For Logically Expanding The Width Of Memory", filed on Jun. 21, 2001, the contents of which are included herein in their entirety. A subtree is dense if the subtree stores at least 16 route or subtree indexes. Each dense subtree descriptor includes a default route memory 306, 308 for storing a default route for the subtree. The subtree descriptor for subtree E includes default route memory 306. The subtree descriptor for subtree F includes default route memory 308.

Route r0 through subtree indexes stored in node $314^2$ in subtree D and node $312^{16}$ in subtree E is the default route for nodes in subtree E and subtree F. Thus, the default route memory 306 for subtree E stores a route index for route r0. Instead of storing a copy of the route index for route r0 for all nodes $312^1$–$312^4$ and $312^9$–$312^{16}$ the respective node in subtree E indicates that the default route index stored in the default route memory 306 is to be used. Instead of storing the route index for route r0 in default route memory 308, the default route memory 308 for subtree F indicates that the default route index stored in default route memory 306 for subtree E is to be used as the default route index for nodes in subtree F, that is, inherit.

Figure 3B:
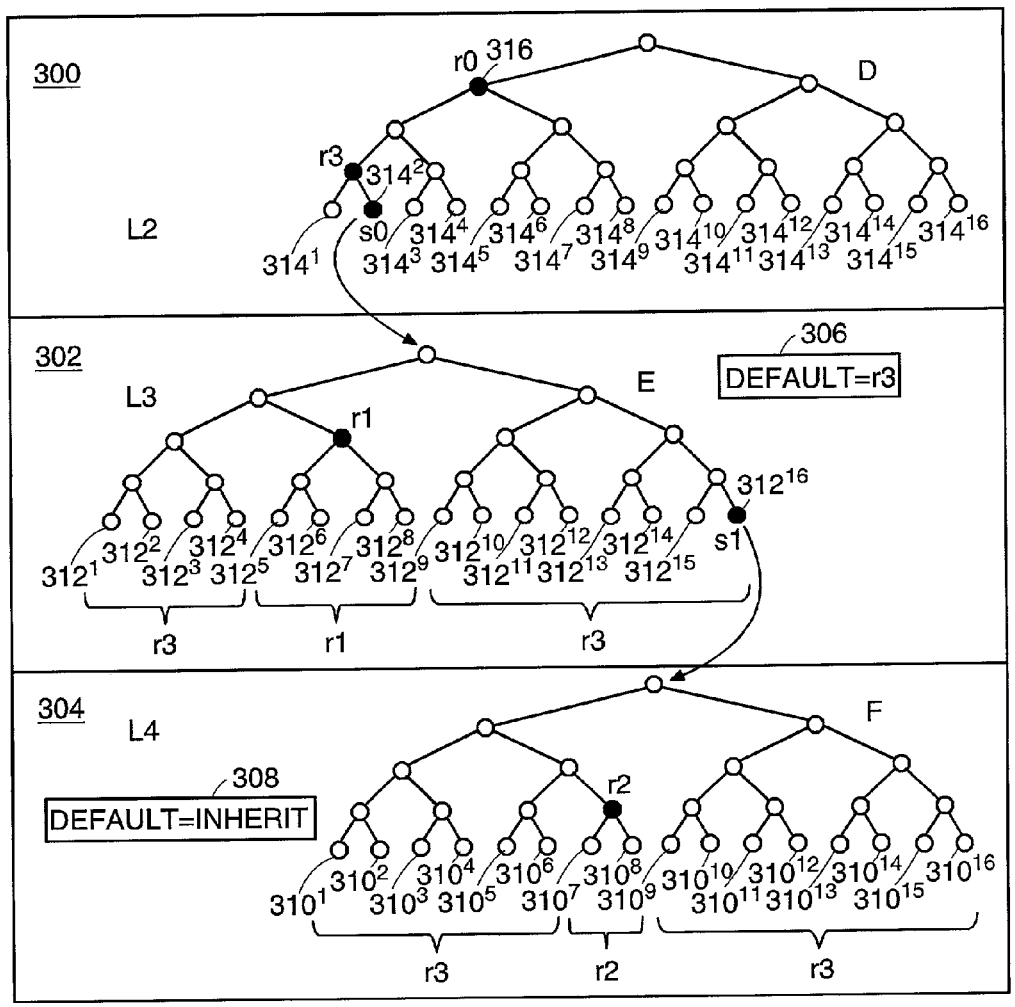
FIG. 3B is the binary tree representation of routes stored in the multi-level lookup table shown in FIG. 3A after adding a route.

FIG. 3B is the binary tree representation of routes stored in the multi-level lookup table shown in FIG. 3A, after adding a route to subtree D. As shown, route r3 has been added to subtree D in level_2 300. The addition of route r3 results in modification of the default route index for subtree E and subtree F.

The addition of route r3 to subtree D requires updating the route index for nodes $312^1$–$312^4$ and $312^9$–$312^{16}$ in subtree E. The update of the default route index for subtree E is performed by a single write, to write the route index for r3 in default route memory 306. No modification is required to the default route memory 308 for subtree F because the default route memory 308 is set to inherit. Thus, the default route index for subtree F is stored in the default route memory 306 for subtree E, that is, the parent subtree.

Thus only a single write operation is required to update the default route for each node in subtree E and subtree F by writing the route index for route r3 in the default route memory 306 for subtree E. If a level has 256 subtrees, a maximum of 256 write operations are required per level to update the default route index for each subtree. Providing a default route memory 306, 308 per subtree limits the worst case update to 256 route index changes per level for 64K nodes in the 256 subtrees. Thus, a route index update to add or modify a route can be performed quickly allowing more route table lookups to be processed.

Figure 4:
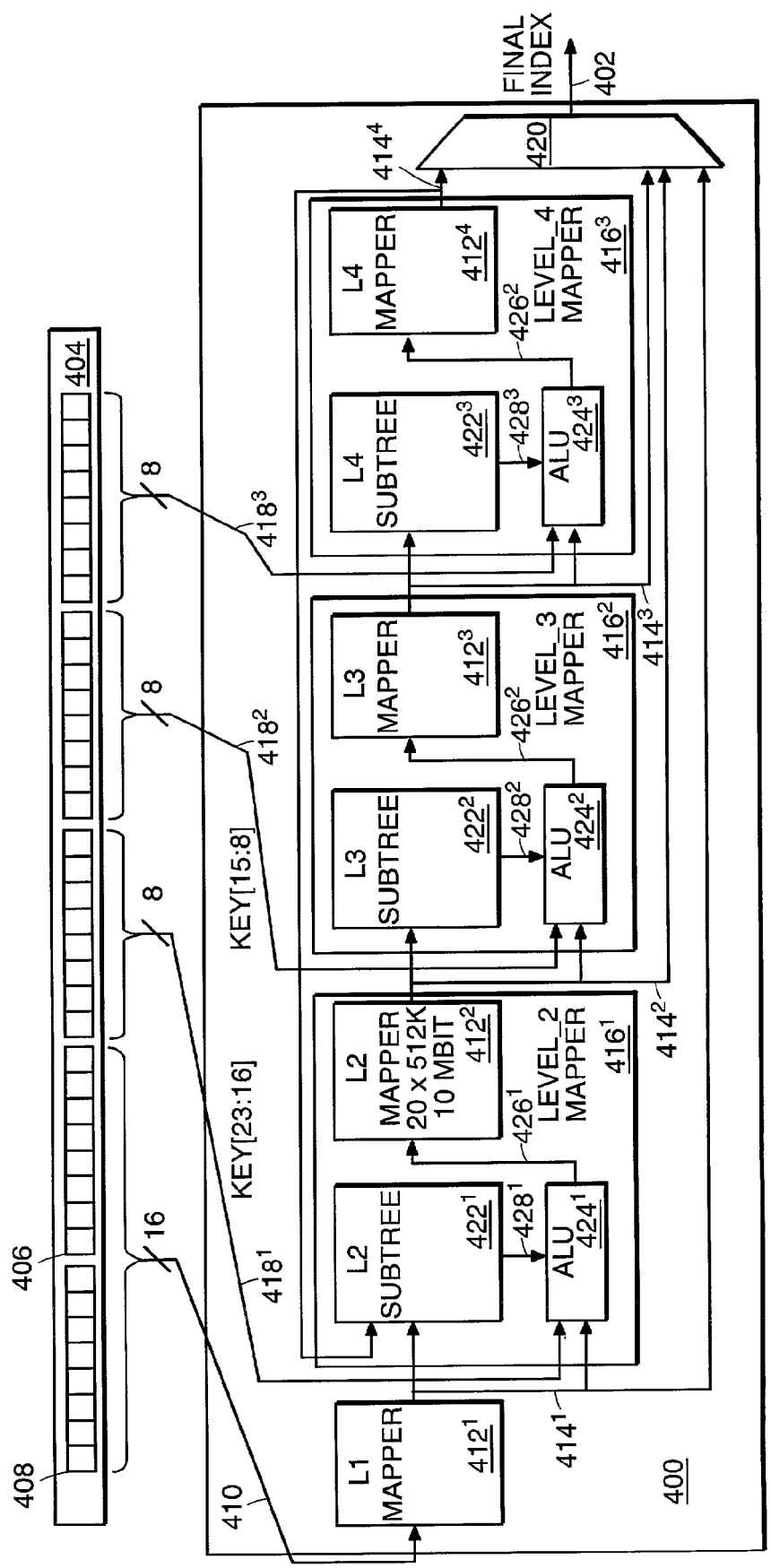
FIG. 4 is a block diagram of a multi-level lookup table.

FIG. 4 is a block diagram of a multi-level lookup table 400. The multi-level lookup table 400 provides a final route index 402 for a key 404. In the embodiment shown, the key 404 is 40 bits wide and includes a 32-bit Internet Protocol Version 4 ("IPv4") address 406 and an 8-bit route table index 408. The first 16-bits 410 of the 40-bit key 404 are coupled to the L1 mapper 412 to search for a route index corresponding to the first 16-bits 410 of the 40-bit key 404 or a pointer to the next level mapper $416^1$ to continue the search.

Three level mappers $416^1$–$416^3$ are included in the multi-level lookup table 400. Each next level mapper $416^1$–$416^3$ searches for a route index corresponding to the result of the search of the respective upper level $414^1$–$414^3$ and a next 8-bits of the 40-bit key $418^1$–$418^3$. The result of the search of the respective upper level $414^1$–$414^4$ is forwarded to a pipeline 420. The result of the search of the multi-level lookup table 400 for a route corresponding to the 40-bit key 404 is provided by the pipeline 420 as the final index 402.

Each level mapper $416^1$–$416^3$ includes a respective subtree memory $422^1$–$422^3$, a mapper $412^2$–$412^4$ and an Arithmetic Logical Unit ("ALU") $424^1$–$424^3$. The subtree memory $422^1$–$422^3$ stores a subtree descriptor per subtree stored in the level. The mapper $412^2$–$412^4$ stores route indexes and subtree indexes for nodes in subtrees stored in the respective subtree memory $422^1$–$422^3$. The ALU generates a mapper index dependent on the result of the search of the upper level $414^1$–$414^3$, the next 8 bits of the key $418^1$–$418^3$ and the selected subtree descriptor $428^1$–$428^3$.

The subtree memory $422^1$–$422^3$ can store dense subtree descriptors and sparse subtree descriptors. A sparse subtree descriptor is stored for a subtree if the subtree has less than sixteen routes or subtree indexes. A dense subtree descriptor is stored for a subtree if the subtree has at least 16 routes or subtree indexes. Dense subtree descriptors and sparse subtree descriptors are described in co-pending U.S. patent application Ser. No. 09/733,627 filed Dec. 8, 2000 entitled "Method And Apparatus For Longest Match Address Lookup" by David A. Brown the contents of which are incorporated herein by reference in its entirety.

Figure 5A:
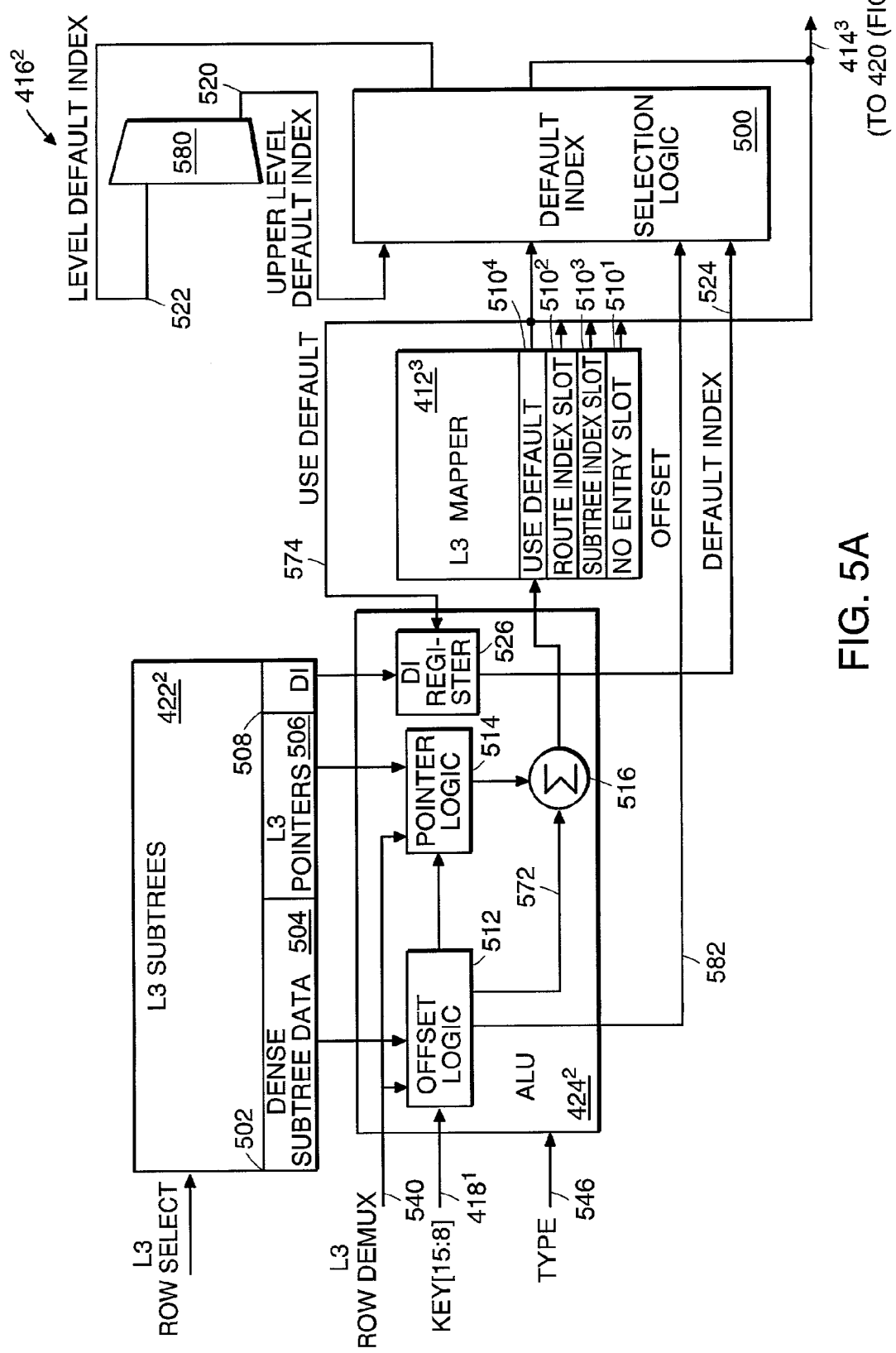
FIG. 5A is a block diagram illustrating selection of a default index for a dense subtree stored in a dense mode subtree entry in one of the level mappers in the multi-level lookup table shown in FIG. 4.

FIG. 5A is a block diagram illustrating selection of a default index for a dense subtree stored in a dense mode subtree entry 502 in one of the level mappers $416^2$ in the multi-level lookup table 400 shown in FIG. 4. The subtree memory $422^1$–$422^3$ can store dense subtree descriptors and sparse subtree descriptors. The state of the type field 546 indicates whether the selected subtree entry is configured in dense mode or sparse mode. Dense mode subtree entry 502 in the subtree memory $422^2$ in level mapper $416^2$ is selected by L3 row select. The dense mode subtree entry 502 includes a dense subtree descriptor stored in the dense subtree data field 504, a dense pointers field 506 and a default index field 508. The dense subtree descriptor stored in the dense subtree data field 504 includes a bit for each node at the bottom level of the dense subtree. Referring to FIG. 3A, the dense subtree descriptor includes a bit for each node $312^1$–$312^{16}$ in subtree E in level 302.

Returning to FIG. 5A, the dense pointers field 506 stores pointers to blocks of mapper entries 510 stored in the mapper $412^3$. The default index field 508 stores a default route index for the dense subtree. The default route index is a pointer to the location of a default route stored in another memory. In an alternative embodiment, the default route can be stored in the default index field 508. The mapper $412^3$ stores mapper entries $510^1$–$510^4$ corresponding to nodes in the dense subtree identified by the dense subtree descriptor. A mapper entry can store a no-entry $510^1$, a route index $510^2$, a subtree index $510^3$ or a "use default" indicator $510^4$. A route index is a pointer to a location in another memory storing the route. In an alternative embodiment the route can be stored in the mapper entry instead of the route index. A subtree index is a pointer to a subtree descriptor stored in subtree memory for the next level. A "use default" indicator is an indication that the default route index for the subtree stored in the default index field 508 is to be used for the selected node in the dense subtree. The Arithmetic Logical Unit (ALU) $424^2$ includes offset logic 512, pointer logic 514, an adder 516 and a default index register 526.

The default index 524 stored in the default index field 508 in the dense mode subtree entry 502 for the selected subtree is stored in the default index register 526. The default index 524 stored in the default index register 526 is forwarded to the default index selection logic 500. The upper level default index 520 stored in a subtree descriptor for the parent subtree is also forwarded to the default index selection logic 500 through the default index pipeline 580. If the default index 524 stored in the default index field 508 is not set to "inherit", the default index selection logic 500 selects the default index 524 as the result of the level search $414^3$. If the default index 524 is set to "inherit", the default index selection logic 500 selects the upper level default index 520 as the result of the level search $414^3$. The result of the level search $414^3$ is forwarded through the pipeline 420 (FIG. 4) and to the next level mapper.

If the selected mapper entry stores "no entry" $510^1$, next hop index $510^2$ or subtree index $510^3$, the data stored in the mapper entry is forwarded as the result of the level search $414^3$ to the next level mapper and to the pipeline 420 (FIG. 4). The level default index 522 forwarded to the default index pipeline 580 is the default route index stored in the default index field 508 if the default index 524 is not "inherit". The upper level default index 520 is forwarded as the level default index 522 to the default index pipeline 580 if the default index 524 is "inherit".

Figure 5B:
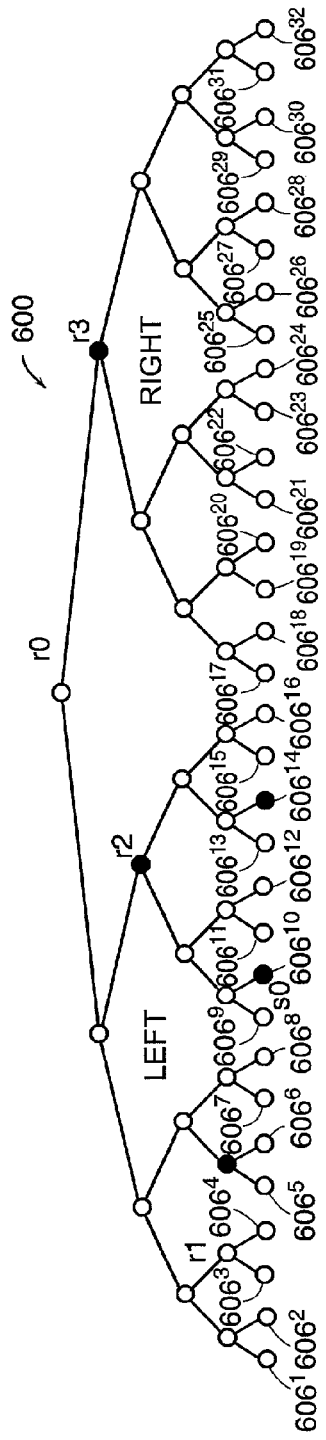
FIG. 5B is a binary tree representation of a dense subtree including routes and subtree indexes.

FIG. 5B is a binary tree representation of a subtree 600 including routes and subtree indexes. The subtree 600 includes routes r1, r2 and r3 and subtree indexes s0 and s1. The route for each of the nodes $606^1$–$606^{32}$ at the bottom of the subtree 600 is either the default route for the subtree, a route r1, r2, or r3, or the search for the route is to continue in another level in a subtree pointed to by subtree index s0 or s1.

Figure 5C:
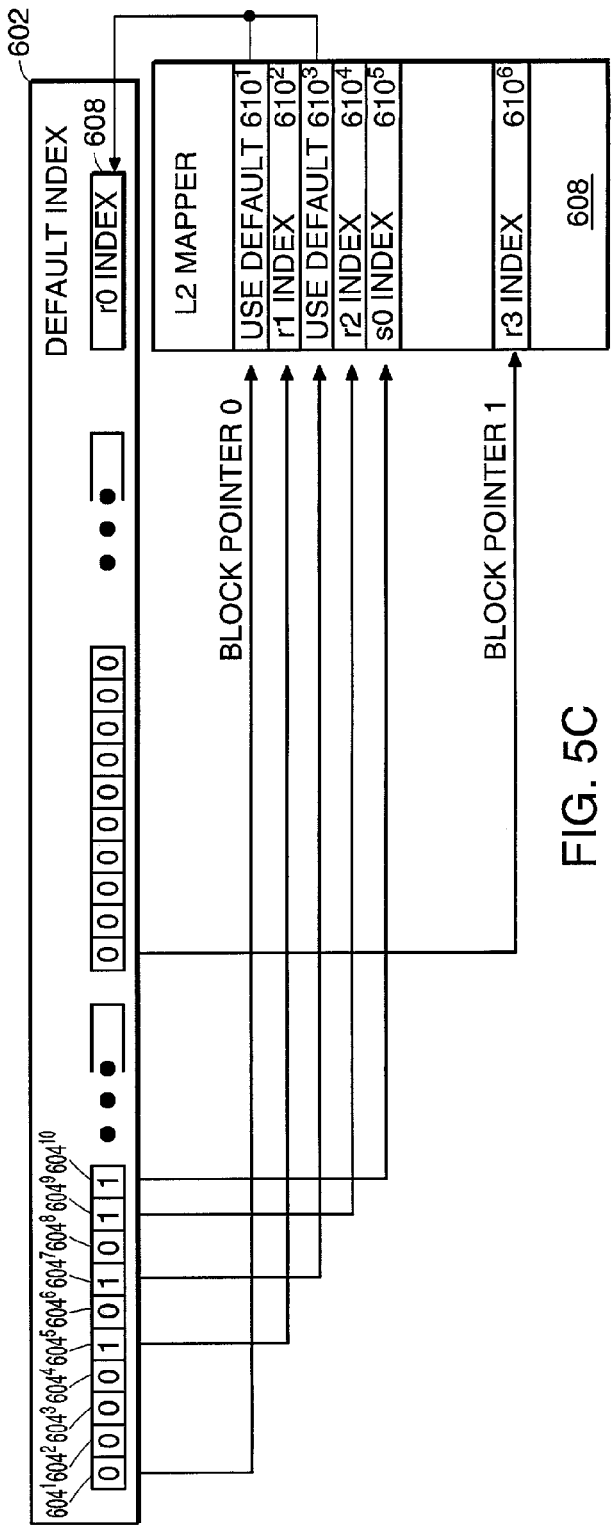
FIG. 5C is a block diagram of a dense mode subtree entry corresponding to the subtree shown in FIG. 5B and a mapper including mapper entries for the dense subtree descriptor.

FIG. 5C is a block diagram of a dense mode subtree entry 602 corresponding to the dense subtree 600 shown in FIG. 5B and a mapper 608 storing mapper entries $610^1$–$610^6$ for the dense mode subtree entry. Mapper entry $610^1$ corresponds to bit $604^1$ in the dense subtree data 504 (FIG. 5A) in dense mode subtree entry 602 and nodes $606^1$–$606^4$ (FIG. 5B) in the subtree 600 (FIG. 5B). Mapper entry $610^1$ stores "use default" indicating that the default route index for r0 stored in the default index field 508 in dense mode subtree entry 602 is to be used as the route index for nodes $606^1$–$606^4$. Mapper entry $610^2$ corresponds to bit $604^5$ in the dense mode subtree entry 602 and nodes $606^5$–$606^6$ in the subtree 600 (FIG. 5B) and stores a route index for route r1 in subtree 600 (FIG. 5B). Mapper entry $610^3$ corresponds to bit $604^7$ in the dense mode subtree entry 602 and nodes $606^7$, and $606^8$ in subtree 600. Mapper entry $610^3$ stores "use default" indicating that the default index for r0 stored in the default index field 508 in the dense mode subtree descriptor entry 602 is to be used as the route index for nodes $606^7$, and $608^8$. If the default route index stored in the default index field 508 in the dense mode subtree entry 602 is modified, mapper entries $610^1$ and $610^3$ will point to the new default route index stored in the default index field 508. Therefore, the update of a default route for nodes in subtree 600 associated with mapper entries $610^2$ and $610^3$ only requires a single write to a default index field 508 in the dense mode subtree entry 602.

The 20-bit default index field 508 can store a route index to be used as the default route index as shown in mapper entry $510^4$ (FIG. 5A). If the default route index is to be inherited, the default index field 508 stores an "inherit" code. In one embodiment, "inherit" is indicated by storing all '1's in the default index field 508. The "inherit" code indicates that the default route stored for the parent subtree is to be used as the default route index for the selected subtree.

If the default index stored in the default index field 508 in the dense mode subtree entry 602 is "inherit", the upper level default index 520 (FIG. 5A) propagated through a default index pipeline 580 from the upper level mapper $412^2$ is propagated through the default index pipeline 580 as the default index for the level mapper currently being searched.

Figure 6A:
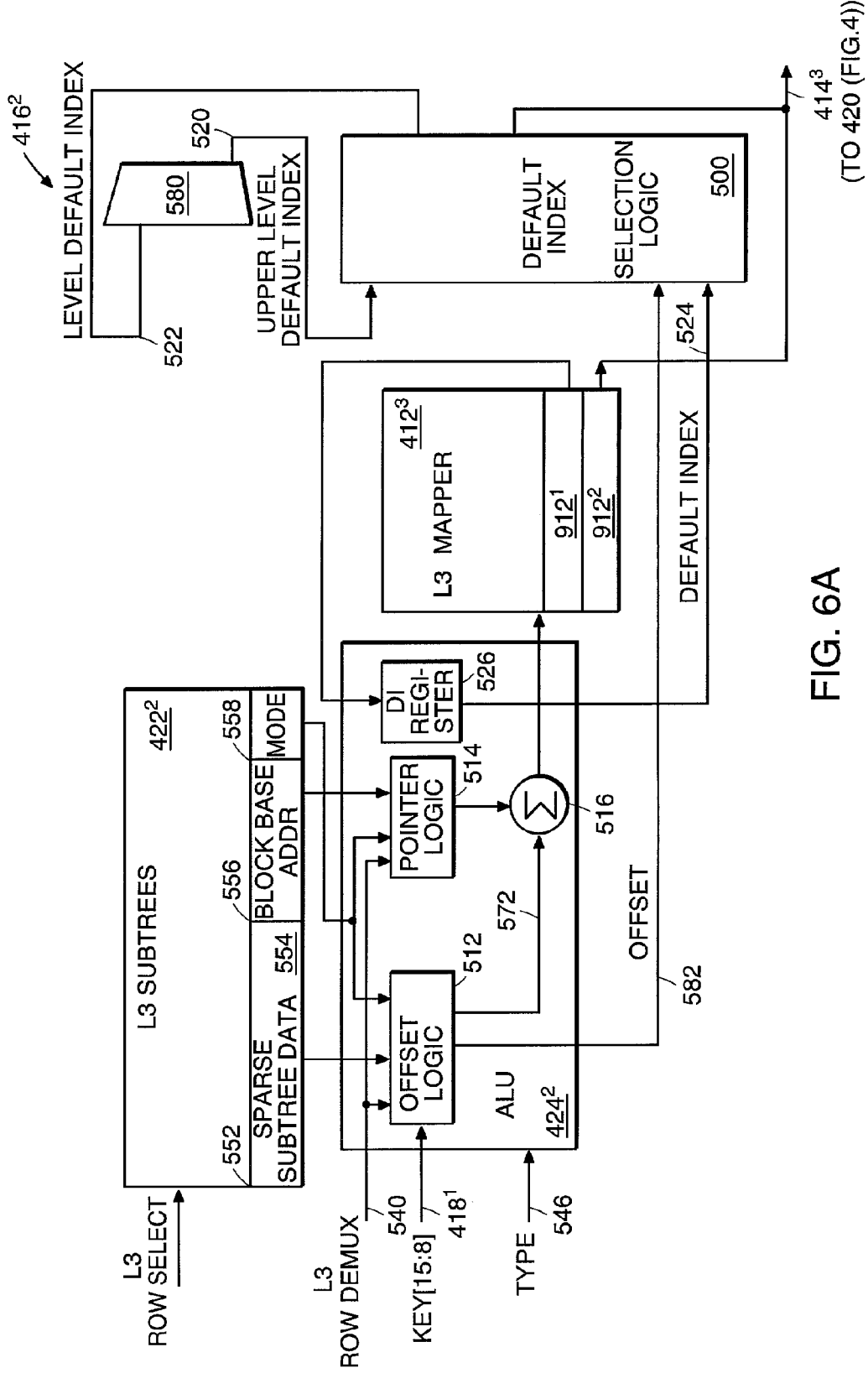
FIG. 6A is a block diagram illustrating selection of a default index for a sparse subtree stored in a mode 0 sparse subtree entry in one of the level mappers in the multi-level lookup table shown in FIG. 4.

FIG. 6A is a block diagram illustrating selection of a default index for a sparse subtree stored in a mode 0 sparse subtree entry 552 in one of the level mappers $416^2$ in the multi-level lookup table 400 shown in FIG. 4. The mode 0 sparse subtree entry 552 includes a sparse data field 554, a block base address 556 and a mode field 558.

In a sparse mode subtree entry, a plurality of sparse subtree descriptors are stored in the sparse data field 554. Thus, a plurality of default indexes must be stored for each sparse mode subtree entry, one for each sparse subtree descriptor stored in the sparse data field 554. As described in co-pending U.S. patent application Ser. No. 09/733,627 entitled "Method and Apparatus for Longest Match Address Lookup" by David A. Brown, the contents of which are incorporated herein by reference in their entirety, the number of sparse subtree descriptors stored in the sparse data field 554 can range from 2 to 16 with each sparse subtree including from 15 to 1 nodes.

The mode field 558 indicates the number of node descriptors stored in each sparse subtree descriptor stored in the sparse data field 554 in a sparse mode subtree entry. All sparse subtree descriptors in a particular sparse mode subtree entry store the same number of node descriptors in each sparse subtree descriptor.

When the mode stored in the mode field 558 is 0, the sparse mode subtree entry is a mode 0 sparse subtree entry 552. In mode 0, the sparse data field 554 in the mode 0 sparse subtree entry 552 stores sixteen sparse subtree descriptors with each sparse subtree having one node. Thus, 16 20-bit default indexes must be stored for a mode 0 sparse subtree entry 552, one for each sparse subtree. Each mode 0 sparse subtree entry 552 requires storage for a default index per sparse subtree and a mapper entry per node. With a total of 16 nodes, one per sparse subtree, a pointer to a block of 16 mapper entries is required. Thus, one 16-bit pointer and 16 20-bit default indexes are required for the mode 0 sparse subtree entry 552. However, the sparse data field 554 in the mode 0 sparse subtree entry 552 can only store a total of 16 16-bit pointers.

Thus, there is insufficient memory available in the mode 0 sparse subtree entry 552 to store the 16 20-bit default indexes and the 16-bit block base pointer 556. Instead, a mode 0 sparse subtree entry 552 storing sixteen sparse subtree descriptors in the sparse data field 554 stores two 16-bit block pointers 556, each of the block pointers pointing to a respective block of 16 mapper entries providing a total of 32 mapper entries for the mode 0 sparse subtree entry. The blocks of mapper entries store 16 default indexes, one per sparse subtree in the mode 0 sparse subtree entry 552 and a route index or subtree index for each of the 16 nodes.

A default index is stored in the mapper $413^3$ in the mode 0 sparse subtree entry 522 for each sparse subtree such that the default route index and the route index for the node for a particular subtree are stored in consecutive locations in the mapper $412^3$. By storing the default route index and route index in consecutive locations in the mapper $412^3$, the default route index can be read at the same time as the route index in the same memory access.

Sparse subtree descriptors stored in the sparse data field 554 in the selected mode 0 sparse subtree entry 552 in subtree memory $422^2$ are forwarded to the offset logic 512. One of the sparse subtree descriptors stored in the sparse data field 554 in the selected mode 0 sparse subtree entry 522 is selected dependent on the state of L3 row demux 540 and forwarded from the mapper entry selected in the upper level mapper and the subtree entry mode stored in the mode field 558.

Two mapper entries $912^1$–$912^2$ are stored in mapper memory $412^3$ for each sparse subtree stored in the mode 0 sparse subtree entry 552. The mapper address associated with each of the mapper entries $912^1$–$912^2$ is computed using the block offset provided by the offset logic 512 and a block base address provided by the pointer logic 514.

The base address is computed using the mode value stored in the mode field 558, the block base address 556 stored in the mode 0 sparse subtree entry 552 and the L3 row demux included in the subtree index $510^3$ (FIG. 5) forwarded from the upper level mapper. The base address is computed as follows:

base address (for the mode 0 sparse subtree descriptor)=block base address+base offset where base offset=((1+nodes/subtree)*sparse subtree descriptor select))

In sparse mode, a block offset 582 generated by the offset logic set to '0' indicates that the default index is to be used. The block offset 582 is '0' if the 'don't care' entry in the CAM in the offset logic is selected. The CAM is described in co-pending U.S. patent application Ser. No. 09/733,627 filed Dec. 8, 2000 entitled "Method And Apparatus For Longest Match Address Lookup" by David A. Brown the contents of which are incorporated herein by reference in its entirety.

Figure 6B:
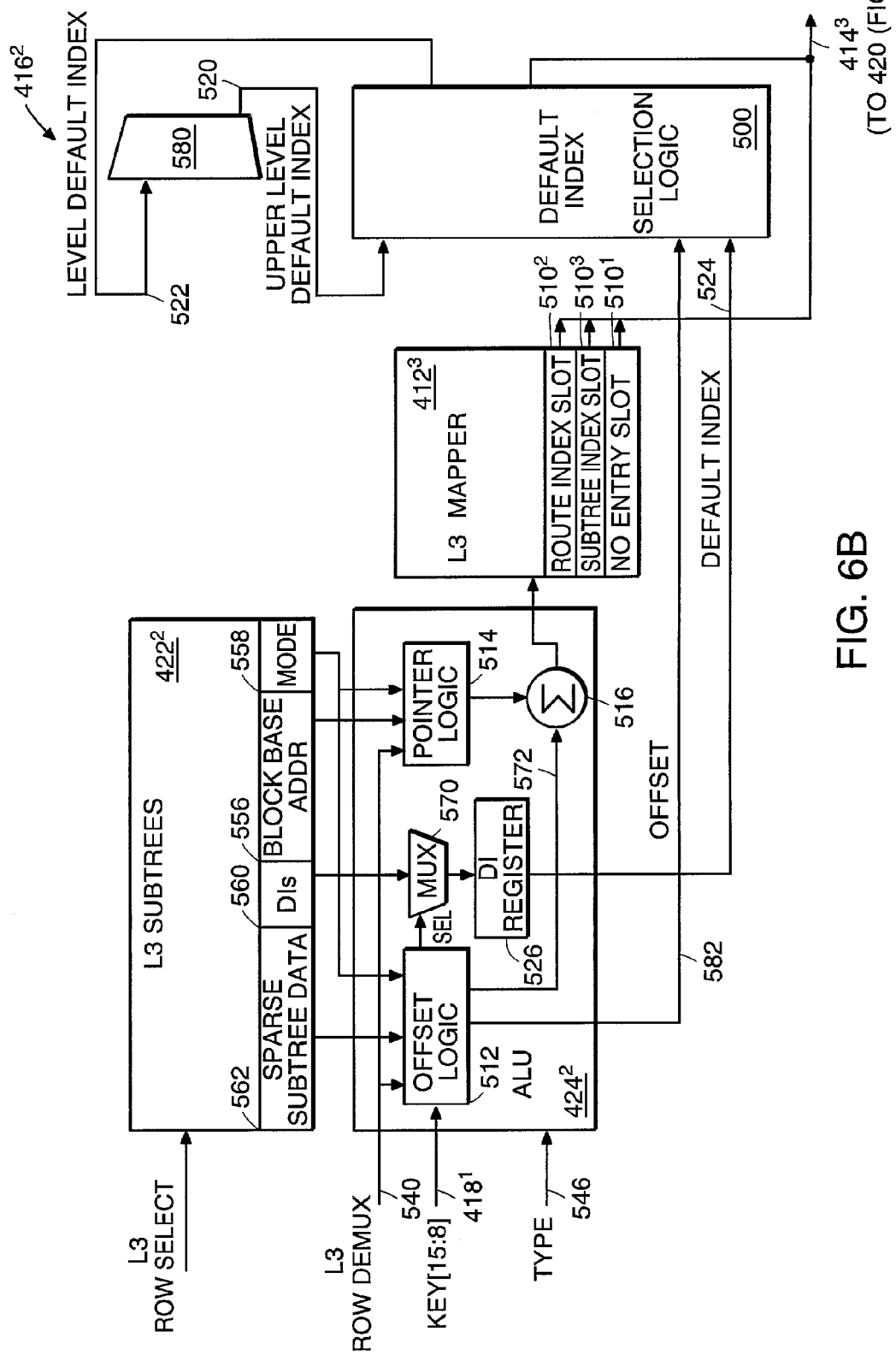
FIG. 6B is a block diagram illustrating selection of a default index for a sparse subtree stored in a non-mode 0 sparse subtree entry in one of the level mappers in the multi-level lookup table shown in FIG. 4.

FIG. 6B is a block diagram illustrating selection of a default index for a sparse subtree stored in a non-mode 0 sparse subtree entry 562 in one of the level mappers $416^2$ in the multi-level lookup table 400 shown in FIG. 4. The non-mode 0 sparse subtree entry 562 includes a set of default indexes 560 and a block base address 556 for the block of 16 pointers allocated for the non-mode 0 sparse subtree entry 562. If a selected node in a selected sparse subtree has a default route, the default entry is selected by the offset logic 512. The default index for the subtree stored in default indexes 560 is selected.

The default indexes stored in the default indexes field 560 are forwarded to the input of a multiplexor 570. The multiplexor 570 selects one of the plurality of default indexes to forward dependent on L3 row demux 540.

Thus, when the block offset 572 is '0' indicating that the default index for the selected subtree is to be used, a mapper address to a mapper entry in the mapper $412^3$ is not required. The mapper address is therefore not generated when the block offset is '0'. Instead, the default index stored for the sparse subtree descriptor is used as the route index for the selected node.

To reduce the number of accesses to the subtree memory $422^2$, the plurality of the default indexes stored in the default indexes field 560 in the selected non-mode 0 sparse subtree entry 562 together with a block base address and mode field is read and forwarded to the ALU $424^2$. The forwarded default indexes are forwarded to the multiplexor 570 in the ALU $424^2$. The selected default index is forwarded through the multiplexor 570 and loaded into a default index register 526. By storing the default index, a second memory access to the subtree memory $422^2$ is avoided, if the default index is required. Instead, the default index stored in the default index register 526 can be accessed directly to provide the route index for the selected node.

Figure 7:
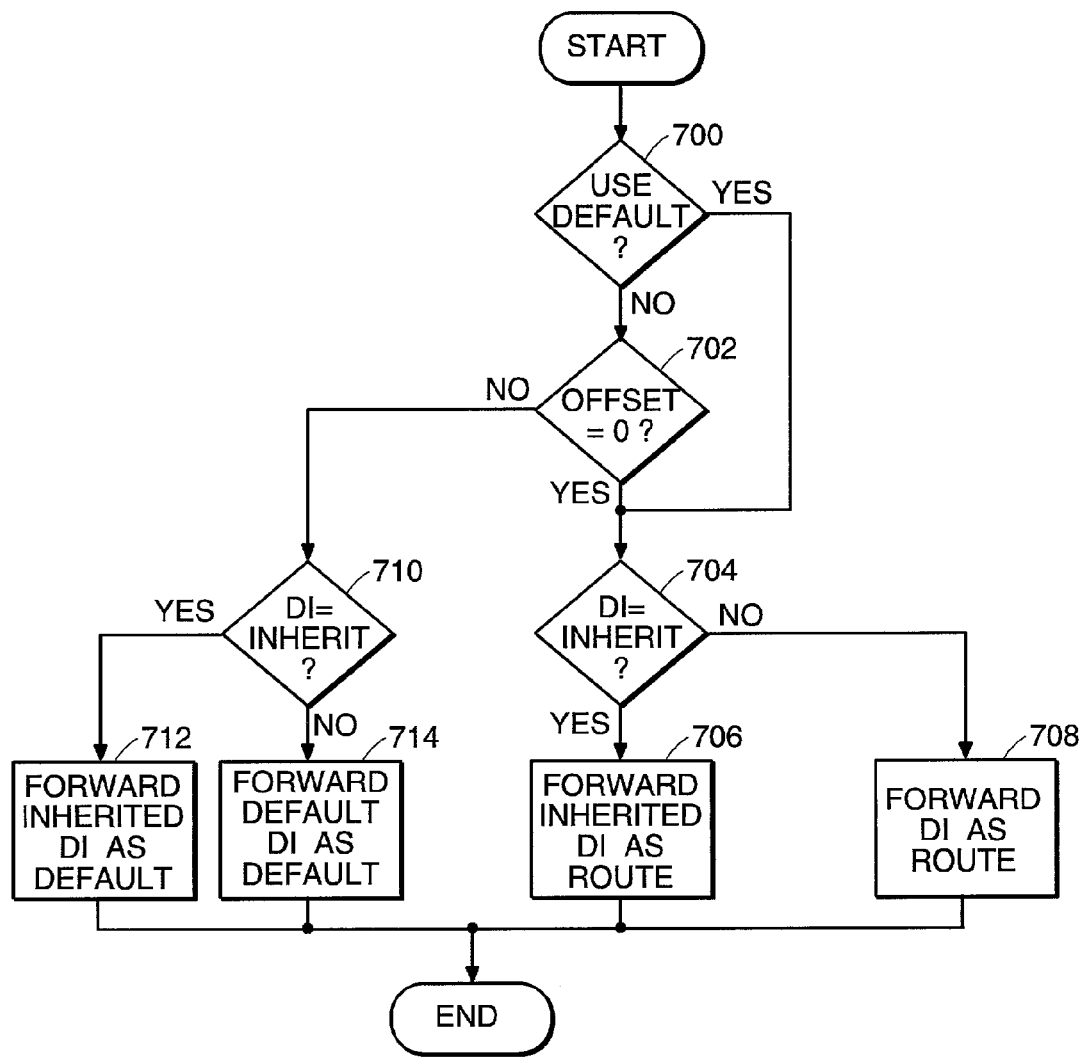
FIG. 7 is a flowchart illustrating the steps implemented in the default index selection logic shown in FIGS. 5A, 6A–B for selecting a default index and mapper data.

FIG. 7 is a flowchart illustrating the steps implemented in the default index selection logic 500 shown in FIG. 5A and FIGS. 6A–B for selecting a level default index (FIG. 5A) and level mapper data $414^3$ (FIG. 5A). The flowchart is described in conjunction with FIG. 5A and FIGS. 6A–6B.

Referring to FIG. 5A, the default index selection logic 500 receives the default index 524 stored in the default index field 508 in the selected dense mode subtree descriptor 502 stored in the subtree memory $422^2$, the upper level default index 520, and use default 574 stored in the selected mapper entry for a dense subtree. Based on the inputs, the default index selection logic 500 forwards a level default index 522 and level mapper data $414^3$.

Returning to FIG. 7, the default index selection logic 500 (FIG. 5A) examines 'use default' 574, if 'use default' 574 indicates the default index is to be used, the selected subtree entry is for a dense subtree and processing continues with step 704. If not, processing continues with step 702.

At step 702, the default index selection logic 500 (FIG. 5A) examines the block offset 582 to determine if the default index is selected for a selected sparse subtree. If the offset 582 is '0', the default index is to be used for the sparse subtree and processing continues with step 704, if the default index is not used, processing continues with step 710.

At step 704, the default index selection logic 500 (FIG. 5A) examines the default index 524 (FIG. 5A). If the default index 524 (FIG. 5A) is "inherit", the upper level default index 520 (FIG. 5A); that is, the default route index forwarded from the upper mapper level is to be used as the default route index and processing continues with step 706. If the default index 524 (FIG. 5A) is not "inherit", the default index 524 (FIG. 5A) is to be used as the default route index and processing continues with step 708.

At step 706, the upper level default index 520 (FIG. 5A) is forwarded as the mapper entry data $414^3$ (FIG. 5A). The mapper entry data $414^3$ (FIGS. 5A, 6A–B) is forwarded on the data pipeline 420. Processing is complete.

At step 708, the default index 524 (5A) stored in the default index register 526 (FIG. 5A) is forwarded as the mapper entry data $414^3$ (FIG. 5A) to the data pipeline 420. Processing is complete.

At step 710, the default index selection logic 500 (FIG. 5A) examines the default index 534, if the default index is "inherit", processing continues with step 712. If not, processing continues with step 714.

At step 712, the upper level default index is forwarded on the default index pipeline 580 (FIG. 5A) as the level default index 522 (FIG. 5A). Processing is complete.

At step 714, the default index 524 is forwarded on the default index pipeline 580 (FIG. 5A) as the level default index 522 (FIG. 5A). Processing is complete.

Thus, storing a default index per subtree improves the performance of route updates. The number of updates is further reduced by inheriting default indexes from a parent subtree. The default index is stored for both dense mode subtrees and sparse mode subtrees.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for updating a multi-level lookup table comprising the steps of:
   providing a default route memory for storing an inherit indicator to indicate that a default route corresponding to the route associated with the root of a subtree is inherited from another subtree, wherein the inherited default route is forwarded by a default index pipeline;
   sharing the default route by nodes in the subtree; and
   modifying the default route of the root of the subtree, in a single write, by updating the default route memory of the root of the subtree to include a route index value.

2. The method as claimed in claim 1 wherein the subtree is a sparse subtree, the number of routes in the sparse subtree is greater than one and a sparse subtree entry associated with the subtree includes the default route memory.

3. The method as claimed in claim 1 wherein the subtree is a sparse subtree, the number of routes in the sparse subtree is one, and a default route memory associated with the sparse subtree stores the default route.

4. A method for updating a multi-level lookup table comprising the steps of:
   providing a default route memory for storing a default route for a subtree, wherein the subtree is a dense subtree and a dense subtree descriptor associated with the subtree includes the default route memory;
   sharing the default route by nodes in the subtree; and
   modifying the default route of a root node, in a single write, by updating the default route memory of the root node to include a route index value.

5. The method as claimed in claim 4 wherein the default route is shared by storing a use default indicator in a mapper entry associated with at least one node in the subtree.

6. The method as claimed in claim 5 further comprising the step of: returning the default route as a result of a search of the lookup table upon detecting the use default indicator stored in the mapper entry.

7. A multi-level lookup table comprising:
   a default route memory which stores an inherent indicator to indicate that a default route associated with the root of the subtree is inherited from another subtree; default logic which returns the default route as a result of a search of the lookup table; and
   a default index pipeline which forwards the inherited default route.

8. The multi-level lookup table as claimed in claim 7 wherein the subtree is a sparse subtree, the number of routes in the sparse subtree is greater than one and a sparse subtree entry associated with the subtree includes the default route memory.

9. The multi-level lookup table as claimed in claim 7 wherein the subtree is a sparse subtree, the number of routes in the sparse subtree is one, and the default route memory is stored in a default mapper entry associated with the sparse subtree descriptor.

10. A multi-level lookup table comprising:
    a default route memory which stores a default route shared by nodes in a subtree, wherein the subtree is a dense subtree and a dense subtree entry associated with the subtree includes the default route memory; and
    default logic which returns the default route as a result of a search of the lookup table.

11. The multi-level lookup table as claimed in claim 10 further comprising: a mapper entry associated with at least one node in the subtree, the mapper entry stores a use default indicator which indicates that the default route stored in the default route memory is the default route for the at least one node, the default route is modified by performing a single write to the default route memory.

12. The multi-level lookup table as claimed in claim 11 wherein the default logic returns the default route upon detecting the use default indicator stored in the mapper entry.

13. A multi-level lookup table comprising:
    a default route memory which stores an inherit indicator to indicate that a default route associated with the root of the subtree is inherited from another subtree; means for returning the default route as a result of a search of the lookup table; and
    means for forwarding the inherited default index.

14. The lookup table as claimed in claim 13 wherein the subtree is a sparse subtree the number of routes in the sparse subtree is greater than one and a sparse subtree descriptor associated with the sparse subtree includes the default route memory.

15. The lookup table as claimed in claim 13 wherein the subtree is a sparse subtree, the number of routes in the sparse subtree is one, and the default route memory is stored in a default mapper entry associated with the sparse subtree descriptor.

16. A multi-level lookup table comprising:
    a default route memory which stores a default route for nodes in a subtree, wherein the subtree is a dense subtree and a dense subtree descriptor associated with the subtree includes the default route memory; and
    means for returning the default route as a result of a search of the lookup table upon detecting the use default indicator stored in the mapper entry.

17. A multi-level lookup table comprising:
    a default route memory which stores a default route for nodes in a subtree; means for returning the default route as a result of a search of the lookup table upon detecting the use default indicator stored in the mapper entry; and
    means for sharing the default route amongst nodes in the subtree by storing a use default indicator in a mapper entry associated with at least one node in the subtree and modifying the default route of a root node, in a single write, by updating the default route memory of the root node to include a route index value.

* * * * *